United States Patent
Stephenson, III et al.

(10) Patent No.: US 7,295,266 B2
(45) Date of Patent: Nov. 13, 2007

(54) REFLECTIVE LAYER FIELD BLOOMING LAYER FOR LC DISPLAY

(75) Inventors: Stanley W. Stephenson, III, Spencerport, NY (US); Terry J. Martin, Rochester, NY (US)

(73) Assignee: Industrial Technology Research Institute, Chutung, Hsinchu (TW)

( * ) Notice: Subject to any disclaimer, the term of this patent is extended or adjusted under 35 U.S.C. 154(b) by 170 days.

(21) Appl. No.: 11/134,757

(22) Filed: May 20, 2005

(65) Prior Publication Data

US 2006/0262247 A1 Nov. 23, 2006

(51) Int. Cl.
*G02F 1/1334* (2006.01)
(52) U.S. Cl. .......................................... 349/86; 349/113
(58) Field of Classification Search ................ 349/40, 349/86, 113
See application file for complete search history.

(56) References Cited

U.S. PATENT DOCUMENTS

| | | | |
|---|---|---|---|
| 3,600,060 | A | 8/1971 | Churchill et al. |
| 4,213,676 | A * | 7/1980 | Kaufmann ................... 349/113 |
| 4,435,047 | A | 3/1984 | Fergason |
| 5,251,048 | A | 10/1993 | Doane et al. |
| 6,639,637 | B2 | 10/2003 | Stephenson |
| 6,707,517 | B2 | 3/2004 | Stephenson |
| 6,788,362 | B2 | 9/2004 | Stephenson |
| 2004/0032545 | A1* | 2/2004 | Stephenson et al. .......... 349/86 |
| 2004/0246411 | A1* | 12/2004 | Stephenson et al. ......... 349/113 |
| 2006/0262245 | A1* | 11/2006 | Burberry et al. .............. 349/86 |
| 2006/0262246 | A1* | 11/2006 | Stephenson, III ............ 349/86 |
| 2006/0262248 | A1* | 11/2006 | Burberry et al. .............. 349/86 |

FOREIGN PATENT DOCUMENTS

| | | |
|---|---|---|
| EP | 1324106 | 7/2003 |
| EP | 1324106 A1 * | 7/2003 |
| EP | 1324107 | 7/2003 |
| GB | 2099169 | 12/1982 |
| WO | 2004/109382 | 12/2004 |

OTHER PUBLICATIONS

Co-Pending U.S. Appl. No. 11/134,020, Stanley W. Stephenson,III, *Field Blooming Color Filter Layer For Displays*, (D-89296/LMB).
Co-Pending U.S. Appl. No. 11/134,758, Burberry et al., *Controlled GAP States For Liquid Crystal Displays*, (D-89431/LMB).
Co-Pending U.S. Appl. No. 11/135,322, Burberry et al., *Conductive Layer To Reduce Drive Voltage In Displays*, (D-90600/LMB).

* cited by examiner

*Primary Examiner*—Andrew Schechter
*Assistant Examiner*—Matthew P Lawson
(74) *Attorney, Agent, or Firm*—Akin, Gump, Strauss, Hauer & Feld LLP (57) ABSTRACT

The present invention relates to a display sheet comprising a substrate for carrying layers of material, an imaging layer comprising a bistable polymer dispersed cholesteric liquid crystal imaging layer, a first patterned transparent conductor disposed on one side of the bistable polymer dispersed cholesteric liquid crystal imaging layer, a color filter layer, at least one reflective field blooming layer coated over the color filter layer, a second patterned electrode on the side of the bistable polymer dispersed cholesteric liquid crystal imaging layer opposite the first patterned conductor and a method for making the same.

18 Claims, 6 Drawing Sheets

REFLECTIVE LAYER FIELD BLOOMING LAYER FOR LC DISPLAY

CROSS REFERENCE TO RELATED APPLICATIONS

Reference is made to commonly assigned, co-pending U.S. patent applications:

Ser. No. 11/134020 by Stanley W. Stephenson, III (Docket 89296) filed of even date herewith entitled "Field Blooming Color Filter Layer For Displays";

Ser. No. 11/134758 by Burberry et al. (Docket 89431) filed of even date herewith entitled "Controlled GAP States For Liquid Crystal Displays"; and Ser. No. 11/133822 by Burberry et al. (Docket 90600) filed of even date herewith entitled "Conductive Layer To Reduce Drive Voltage In Displays", incorporated herein by reference.

FIELD OF THE INVENTION

The present invention relates to a display sheet having a cholesteric liquid layer that can change states to provide a viewable image.

BACKGROUND OF THE INVENTION

Currently, information is displayed using assembled sheets of paper carrying permanent inks or displayed on electronically modulated surfaces such as cathode ray displays or liquid crystal displays. Printed information cannot be changed. Electrically updated displays are heavy and expensive. Other sheet materials can carry magnetically written areas to carry ticketing or financial information, however magnetically written data is not visible.

Media systems exist that maintain electronically changeable data without power. Such system can be electrophoretic (Eink), Gyricon or polymer dispersed cholesteric materials. An example of electronically updateable display can be found in U.S. Pat. No. 3,600,060 issued Aug. 17, 1971 to Churchill that shows a device having a coated then dried emulsion of cholesteric liquid crystals in aqueous gelatin to form a field responsive, bistable display. U.S. Pat. No. 3,816,786 discloses a layer of encapsulated cholesteric liquid crystal responsive to an electric field. The electrodes in the patent can be transparent or non-transparent and formed of various metals or graphite. It is disclosed that one electrode must be light absorbing and it is suggested that the light absorbing electrode be prepared from paints contains conductive material such as carbon.

Fabrication of flexible, electronically written display sheets is disclosed in U.S. Pat. No. 4,435,047 issued Mar. 6, 1984 to Fergason. A substrate supports a first conductive electrode, one or more layers of encapsulated liquid crystals, and a second electrode of electrically conductive ink. The conductive inks form a background for absorbing light, so that the display areas appear dark in contrast to non-display areas. Electrical potential applied to opposing conductive areas operates on the liquid crystal material to expose display areas. Because the liquid crystal material is nematic liquid crystal, the display ceases to present an image when de-energized.

The patent discloses the use of dyes in either the polymer encapsulant or liquid crystal to absorb incident light. Nematic liquid crystal is used, which absorbs light and does not maintain an image in the absence of a field. The dyes are part of a solution, and not solid submicrometer particles. The patent further discloses the use of a chiral dopant in example 2. The dopant improves the response time of the nematic liquid crystal, but does not operate in a light-reflective state.

U.S. Pat. No. 5,251,048 discloses a light modulating cell having a polymer dispersed chiral nematic liquid crystal. The chiral nematic liquid crystal has the property of being electrically driven between a planar state reflecting a specific visible wavelength of light and a light scattering focal conic state. Chiral nematic liquid crystals, also known as cholesteric liquid crystals, have the capacity of maintaining one of multiple given states in the absence of an electric field. Black paint is applied to the outer surface of rear substrate to provide a light absorbing layer outside of the area defined by the intersection of segment lines and scanning lines.

Cholesteric liquid crystals reflect a portion of the visible spectrum when in a high reflection state. It is preferable that the reflective state have neutral color balance. It would be useful to create a neutral density reflective cholesteric display. It would be useful for such display to be fabricated using simple, low cost processes. It would be useful for such displays to use low drive voltage.

PROBLEM TO BE SOLVED

There remains a need for a reduced cost, display having excellent brightness, high contrast, and low switching voltage.

SUMMARY OF THE INVENTION

The present invention relates to a display sheet comprising a substrate for carrying layers of material, an imaging layer comprising a bistable polymer dispersed cholesteric liquid crystal imaging layer, a first patterned transparent conductor disposed on one side of the bistable polymer dispersed cholesteric liquid crystal imaging layer, a color filter layer, at least one reflective field blooming layer coated over the color filter layer, a second patterned electrode on the side of the bistable polymer dispersed cholesteric liquid crystal imaging layer opposite the first patterned conductor and a method for making the same.

ADVANTAGEOUS EFFECT OF THE INVENTION

This invention provides a field blooming layer for cholesteric displays using a color filter layer and reflective surface. The reflective layer most desirably operates in conjunction with a color filter layer to provide complementary light in a polymer dispersed cholesteric display and may be codeposited with other layers of the display.

The present invention provides a bright, color neutral image. The display may be formed using simple, room temperature processes. Submicrometer particles of reflective metal, in particular aluminum, in a binder provide a stable light reflector as a thin layer having little effect on drive voltages. The reflective layer can be coated simultaneous with a binder solution dispersed cholesteric liquid crystal.

DETAILED DESCRIPTION OF THE INVENTION

The present invention relates to a display sheet comprising a substrate for carrying layers of material, an imaging layer comprising a bistable polymer dispersed cholesteric liquid crystal material, a first patterned transparent conductor disposed on one side of the imaging layer, a color filter layer, a reflective field blooming layer coated over the color filter layer, and a second patterned electrode on the side of the liquid crystal material opposite the first conductor.

Figure 1:
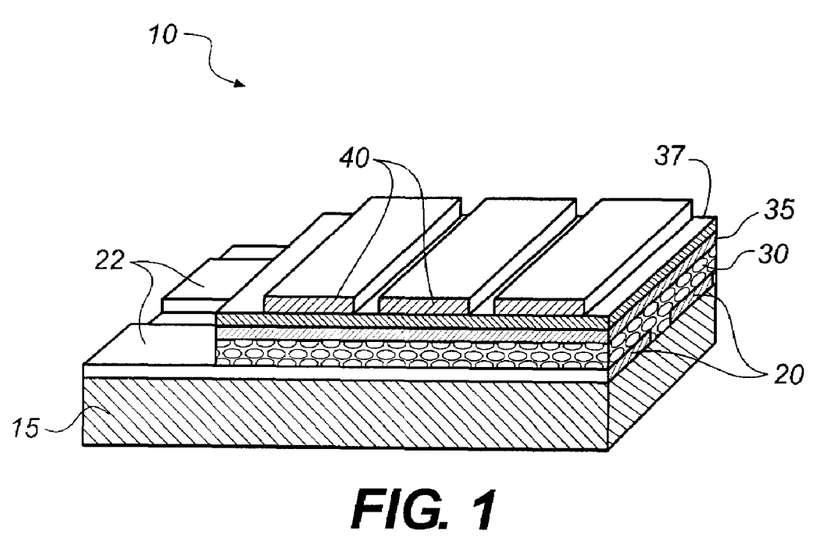
FIG. 1 is a perspective of a display in accordance with the present invention.

FIG. 1 is a perspective section view of one embodiment of a display in accordance with the invention, which employs a polymer dispersed cholesteric material. A sheet designated as display 10 is made in accordance with the present invention. Display 10 includes a display substrate 15, which may be a thin transparent polymeric material. In an exemplary embodiment, display substrate 15 is a 125 micrometer thick sheet of polyester film base. Other polymers, such as transparent polycarbonate, can also be used.

One or more first transparent conductors 20 are formed on display substrate 15. First transparent conductors 20 comprise a set of adjacent traces organized to form the first set of traces for a matrix display. The gap between first conductors 20 is preferably kept as narrow as possible, while maintaining electrical isolation between adjacent conductors. A thin portion of cholesteric material lying in the conductor free area will not respond to applied electrical fields. First transparent conductors 20 may be tin-oxide, indium-tin-oxide (ITO), with ITO being the preferred material. Typically the material of first transparent conductors 20 is sputtered or coated as a layer over display substrate 15 having a resistance of less than 1000 ohms per square. First transparent conductors 20 can be formed in the conductive layer by conventional lithographic or laser etching means. Transparent first transparent conductors 20 can also be formed by printing a transparent organic conductor such as PEDT/PSS, PEDOT/PSS polymer, which materials are sold as Baytron® P by Bayer AG Electronic Chemicals. Portions of first transparent conductors 20 can be uncoated to provide exposed first conductors 22.

Cholesteric layer 30 overlays first transparent conductors 20. Cholesteric layer 30 contains cholesteric liquid crystal material, such as those disclosed in U.S. Pat. No. 5,695,682 to Doane et al., the disclosure of which is incorporated by reference. Such materials are made using highly anisotropic nematic liquid crystal mixtures and adding a chiral doping agent to provide helical twist in the planes of the liquid crystal to the point that interference patterns are created that reflect incident light. Application of electrical fields of various intensity and duration may be employed to drive a chiral nematic (cholesteric) material into a reflective state, to a near-transparent or transmissive state, or an intermediate state. These materials have the advantage of having first and second optical states that are both stable in the absence of an electrical field. The materials may maintain a given optical state indefinitely after the field is removed. Cholesteric liquid crystal materials can be formed, for example, using a two component system such as MDA-00-1444 (undoped nematic) and MDA-00-4042 (nematic with high chiral dopant concentrations) available from E.M. Industries of Hawthorne, N.Y.

Cholesteric layer 30 may be, for example, E.M. Industries' cholesteric material BL-118 dispersed in deionized photographic gelatin. The liquid crystal material is mixed at 8% concentration in a 5% gelatin aqueous solution. The liquid crystal material is dispersed to create an emulsion having 8-10 micron diameter domains of the liquid crystal in aqueous suspension. The domains may be formed using the limited coalescence technique described in U.S. Pat. No. 6,423,368, incorporated herein by reference. The emulsion is coated on a polyester display substrate 15 over the first transparent conductor 20 and dried to provide an approximately 9 micron thick polymer dispersed cholesteric coating. Other organic binders such as polyvinyl alcohol (PVA) or polyethylene oxide (PEO) may be used in place of the gelatin. Such emulsions are machine coatable using coating equipment of the type employed in the manufacture of photographic films. A thin layer of gelatin may be applied over first transparent conductor 20 to provide an insulator prior to applying cholesteric layer 30 as disclosed U.S. Pat. No. 6,6904,471, incorporated herein by reference. Coatings made from such emulsions appear bright after coating.

Figure 2:
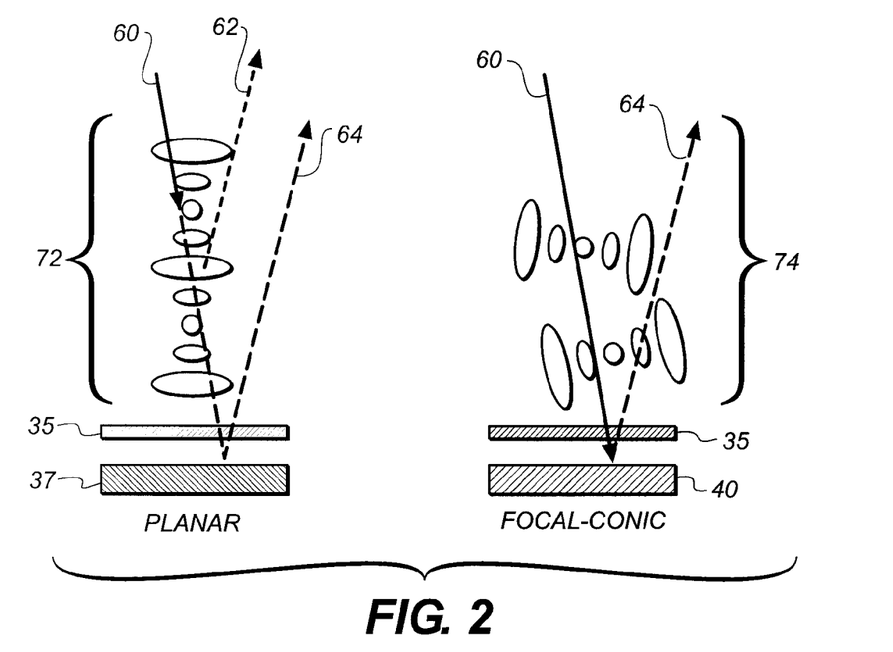
FIG. 2 is a schematic sectional view of a chiral nematic material, respectively, in a planar and focal conic state responding to incident light.

FIG. 2 is a schematic section view of optical states of one embodiment of a display in accordance with the present invention. The left diagram demonstrates the optical path when the cholesteric material is in a planar state. Incident light 60 strikes planar liquid crystal 72 which reflects a portion of incident light 60 as reflected light 62. The remaining light passes through color filter layer 35.

Color filter layer 35 may be a light absorbing dye or pigment containing layer that operates on a portion of the light passing through color filter layer 35. Particular wavelengths of light are absorbed, and the remaining light strikes reflective second conductor 40. Light is reflected from reflective layer 37 and passes through color filter layer 35 a second time, then passes through planar material 72 to become complementary light 64. Complementary light 64 operating in conjunction with cholesteric liquid crystal having peak reflectance near 575 nanometers together can form a substantially color neutral reflected light when cholesteric material is in planar state 72.

On the right side of FIG. 2, the liquid crystal material is in a focal conic state 74 and transmits incident light 60. Color filter layer 35 provides complementary light 64 when the liquid crystal material is in a focal conic state. As one alternative, color filter layer 35 may be a thin, black layer that absorbs across all wavelengths of light. With a black color filter layer 35, when the cholesteric material is in the focal conic state, the image will be essentially black.

Figure 3:
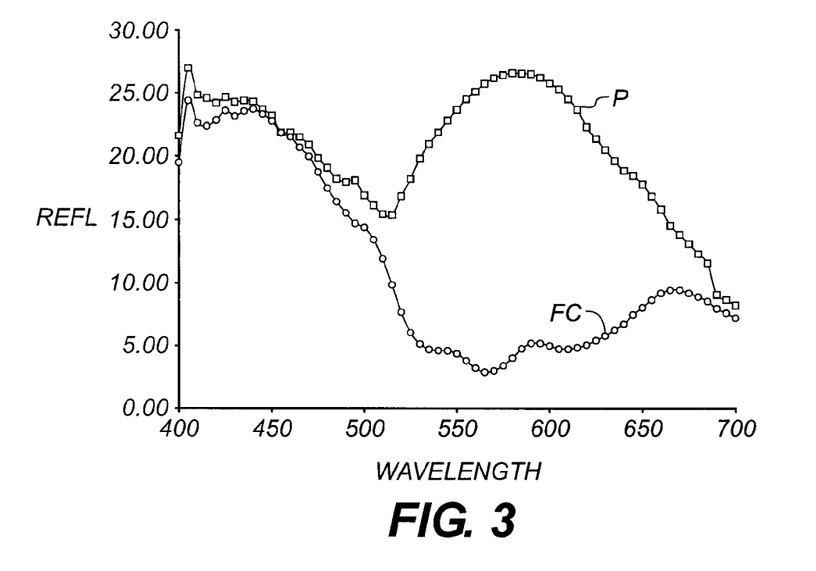
FIG. 3 is a plot of the spectra for a polymer dispersed liquid crystal material having a color filter layer and a reflective layer.

FIG. 3 is a plot of the spectra for a yellow polymer dispersed cholesteric liquid crystal material with a blue color filter layer in the planar (P), focal conic (FC) and planar (P) state. When the cholesteric material is in the planar state, the display appears substantially color neutral. When the display is written into the focal conic state, the display appears blue.

Returning to FIG. 1, color filter layer 35 overlays cholesteric layer 30. In one embodiment, color filter layer 35 is composed of pigments that are milled below 1 micrometer to form "nanopigments" in a binder. Such pigments are very effective in absorbing wavelengths of light in very thin (sub-micrometer) layers. Such pigments can be selected to be electrically inert to prevent degradation interference from electrical display fields applied to display 10. Such pigments are disclosed in U.S. Pat. No. 6,788,362, incorporated herein by reference.

Polymer dispersed cholesteric material in experimental formulation reflected approximately 25% of light at 575 nanometers when the material is in the planar state. The effective reflectivity of the reflective layer should be as high as possible, preferably above 80 percent reflectivity. The dye concentration is selected so that the passage of light through color filter layer 35, reflected by reflective layer 37 and back through color filter layer 35 would have approximately 25% reflected blue light, as measured at the peak reflected wavelength of 450 nanometers.

The reflectance for each color channel (red, green and blue) will be approximately equal for all three color channels, and the display will have a neutral, light gray appearance when the cholesteric liquid crystal is in the planar state. When a display is written into the focal-conic state, the display will appear to be a light blue.

In the present embodiment, in FIG. 1, color filter layer 35 is coated over cholesteric layer 30 to provide a light absorbing layer that provides a specific contrast state to reflected light. As mentioned above, color filter layer 35 may be designed to provide a specific amount of light at wavelengths not reflected by the cholesteric liquid crystal in the planar state to create a more color neutral image. The coating may be simultaneous with the deposition of cholesteric layer 30 or as a separate step.

Reflective layer 37 is composed of fine reflective particles, such as aluminum, in a binder. The layer which contains the fine particles is reflective but not electrically conductive. The fine reflective particles may include aluminum, titanium, silver, nickel or chromium and combinations thereof. The particles can be oxides or nitrides of those metals or combinations of metals that together form a reflective layer, which is nonconductive. The particles should be fine and form optically reflective surfaces using a thin layer to prevent increases in driving field. Fine particles may include polymer dispersed submicron particles. The layer is preferably less than 2 microns thick.

The particles are preferably not electrically conductive when suspended in the polymer binder, but carry an applied electrical field to provide the field blooming, also referred to in the art as field spreading, phenomenon as found in U.S. Pat. No. 6,639,637, incorporated herein by reference, and U.S. Pat. No. 6,707,517, incorporated herein by reference. The reflective layers, when formed of particles of sufficient conductivity, such as aluminum, provide field blooming properties. When disposed between the state changing layer, for example, the liquid crystal layer, and at least one of the conductive layers, the field blooming layers provide a change of state in the state changing layer, for example, the liquid crystal layer, outside of areas between both conductors in response to a field applied between the first and second conductors which changes the state of the liquid crystals. The field blooming property provides active material between second conductors. Prior art has disclosed the phenomenon for black and transparent layers. In this application, the phenomenon is observed in a reflective layer, which operates in conjunction with a color filter layer to provide complementary reflective light not provided when cholesteric liquid crystal is in the planar state.

A preferred embodiment utilizes 1 micron aluminum particles in a gelatin binder. Dispersing aluminum powder in a water bath having dissolved gelatin forms a coatable reflective layer. The suspension can be coated using photographic processes that deposit the suspension in a heated, low viscosity state and chill the layer to a high viscosity state before drying. Water is removed from the coated layer while maintaining the high viscosity of the coated layer as found in U.S. Pat. No. 6,704,073, incorporated herein by reference.

In one embodiment, reflective layer 37 is 1 micron aluminum powder in a gelatin binder less than 1 micron thick. The layer is deposited as a wet layer over color filter layer 35 and dried to form a submicron layer which is electrically nonconductive as a layer and highly reflective. The aluminum powder may be 1 micron aluminum powder from Accumet Material, Briarcliff Manor, N.Y. The ratio of fine particles to polymer binder is controlled so that the sheet resistance of the layer is not electrically conductive, typically greater than 1 mega ohm per square. The Aluminum powder to binder may be in a 1:1 volumetric ratio. Reflective layer 37 is preferably over 90% reflective and extends applied electrical fields over 1 mm from the edge of a field-carrying (conductive) layer.

The voltage required to change the optical state of the liquid crystal layer is proportional to the distance between the opposing conductors. The liquid crystal layer is desirably at least 4 microns thick to have high reflectivity. The reflective field blooming layer transmits an applied voltage sufficiently so that the thickness of field blooming layer does not require substantial increases in drive voltages.

Figure 4:
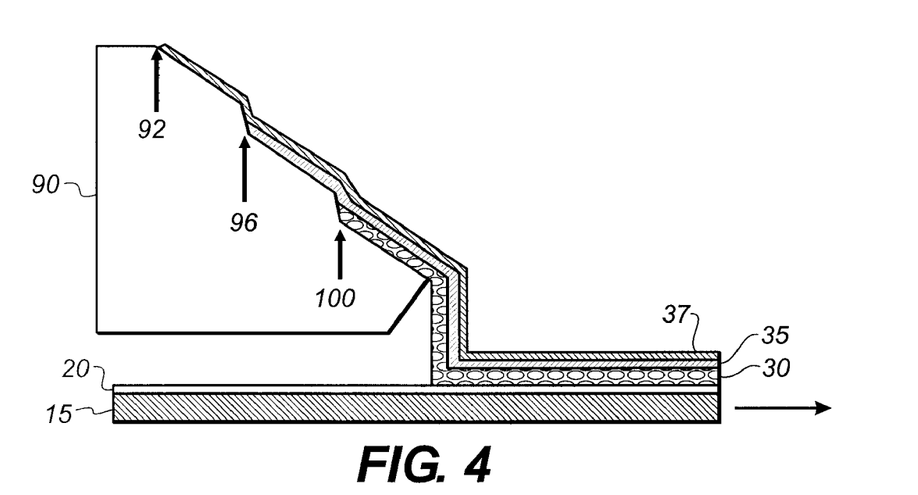
FIG. 4 is a side view of a display being coated in accordance with the invention.

FIG. 4 is a side view of a display being coated in accordance with the invention. In the embodiment of FIG. 4, multilayer coating equipment used in the photographic industry provides cholesteric layer 30, color filter layer 35 and reflective layer 37 as codeposited layers. Color filter layer 35 and reflective layer 37 are significantly thinner than cholesteric layer 30 and have minimal effect on the electrical field strength required to change the state of the cholesteric liquid crystal material.

Substrate 15, having transparent first conductors 20, moves relative to coating block 90. Coating block 90 is a slide coater of conventional design. Fluidized reflective layer 37 is pumped through a slot 92 and flows in a laminar manner down a slope. Fluidized color filter layer 35 is pumped through a second slot 96 downstream of slot 92. Because the two streams are laminar flow, fluidized reflective layer 37 lies over fluidized color filter layer 35 without mixing. Fluidized cholesteric layer 30 is pumped through a slot 100 further down stream, and the first two layers lie over fluidized cholesteric layer 30 without mixing. The fluidized layers fall onto transparent second conductors 20 on substrate 15 that is transported relative to coating block 90. The three fluid layers may contain gelatin in solution as a binding agent. The gelatin in all three layers is chill set and dried simultaneously, creating a set of display layers prepared to receive second conductor 40. Further layers may be deposited simultaneous with the fluidized layers.

Second conductors 40 overlay reflective layer 37. Second conductors in the invention comprise a set of adjacent traces organized to form in conjunction with first conductors 20 to form a matrix display. The gap between second conductors 40 is preferably kept as narrow as possible, while maintaining electrical isolation between adjacent conductors. The field blooming property of reflective layer 37 permits the thin portion of cholesteric material lying in the conductor free area to respond to applied electrical fields. Second conductors 40 have sufficient conductivity to operate in conjunction with first transparent conductors 20 to induce an electric field across cholesteric layer 30 strong enough to change the optical state of the polymeric material. Second conductors 40, especially for applications requiring complementary light 64, are preferably formed of reflective metal, for example, by vacuum deposition of conductive and reflective material such as aluminum, chrome or nickel. In the case of vacuum-coated second conductors 40, aluminum or silver provide very high reflectance and conductivity. The layer of conductive material can be patterned using well known techniques such as photolithography, laser etching or by application through a mask.

In another embodiment, second conductors 40 may be formed by screen printing a reflective and conductive formulation such as UVAG® 0010 from Allied Photochemical of Kimball, Mich. Such screen printable conductive materials comprise finely divided silver in an ultraviolet curable resin. After printing, the material is exposed to ultraviolet radiation greater than 0.40 Joules/cm$^2$, the resin will polymerize in 2 seconds to form a durable surface. Screen printing is preferred to minimize the cost of manufacturing the display. Alternatively, screen printing a thermally cured silver bearing resin can form second conductors 40. An example of such a material is Acheson Electrodag® 461SS, a heat cured silver ink. In the case that the color filter layer 35 is black, any type of conductor can be used including black carbon in a binder.

Second conductors 40 oxidize over time. In particular, printed silver conductive material oxidizes into an oxide with reduced reflectivity which changes the color of display 10. Aluminum oxide particles in reflective layer 37 have an oxide surface in the as-deposited state, which maintains a fixed, highly reflective state and field blooming over time and under extremes of environmental conditions. The fixed reflectivity and field blooming maintain constant optical properties of display 10.

Figure 5:
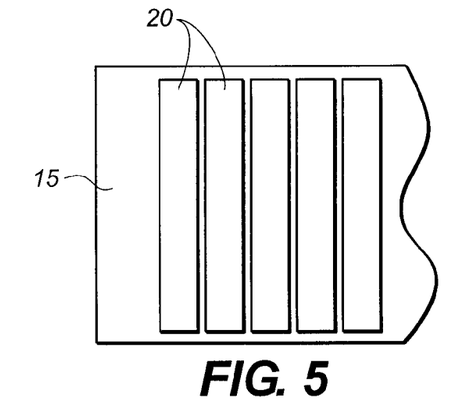
FIG. 5 is a rear view of a sheet in accordance with the present invention having a patterned first conductor.
Figure 6:
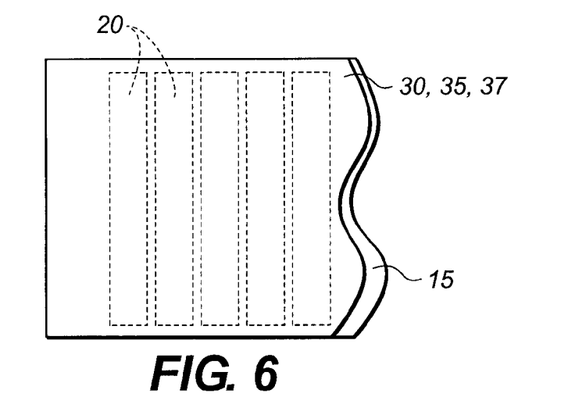
FIG. 6 is a rear view of a sheet in accordance with the present invention having a polymer dispersed cholesteric liquid crystal layer and a color filter layer.
Figure 7:
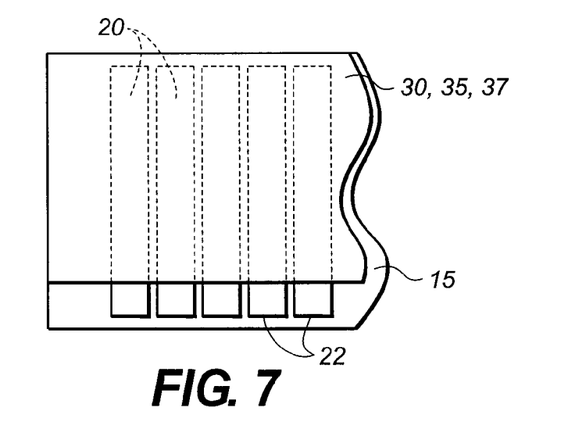
FIG. 7 is a rear view of a sheet in accordance with the present invention having exposed first conductors.

A process for fabricating display 10 will now be described. FIG. 5 is a rear view of a sheet in accordance with the one embodiment of the present invention, which sheet has a patterned first conductor 20. A substrate 15 is provided with a plurality of patterned first transparent conductors 20. First transparent conductors 20 in the invention comprise a set of adjacent traces organized to form the first set of traces for a matrix display. FIG. 6 is a rear view of a sheet in accordance with the present invention having a polymer dispersed cholesteric liquid crystal layer 30 and a color filter layer 35 and reflective layer 37 (only reflective layer 37 is viewable). In one embodiment, cholesteric layer 30, color filter layer 35 and reflective layer 37 are codeposited. FIG. 7 is a rear view of a sheet in accordance with the present invention having exposed first conductors 22. Portions of cholesteric layer 30, color filter layer 35 and reflective layer 37 can be removed, for example, by using a solvent to form exposed first conductors 22. Alternatively, polymer dispersed cholesteric liquid crystal layer 30 and a color filter layer 35 are deposited in a manner that exposes transparent first conductors 20 to create exposed first conductors 22.

Figure 8:
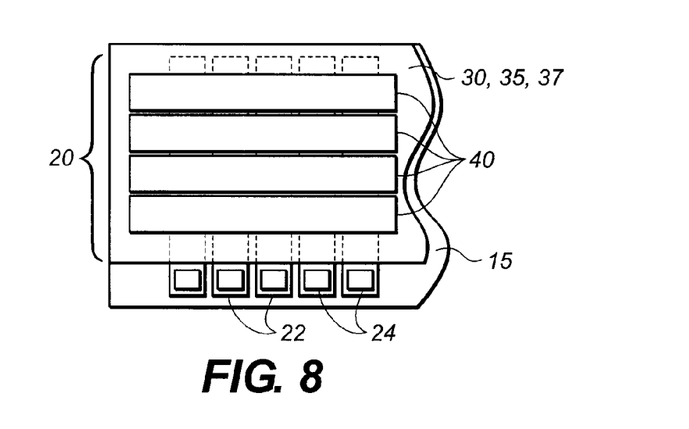
FIG. 8 is a rear view of a sheet in accordance with the present invention having printed second conductors.

FIG. 8 is a rear view of a sheet in accordance with the present invention having applied second conductors 40. Second conductors 40 in the invention comprise a set of adjacent traces organized to form, in conjunction with first conductors 20, a matrix display. Conductive material may be deposited in a vacuum environment and laser etched or conductive material may be selectively deposited, in one embodiment by screen printing, to create second conductors 40. Additional printed material may be applied with second conductors 40 to create protective coverings 24 over each exposed transparent second conductor 22.

Figure 9:
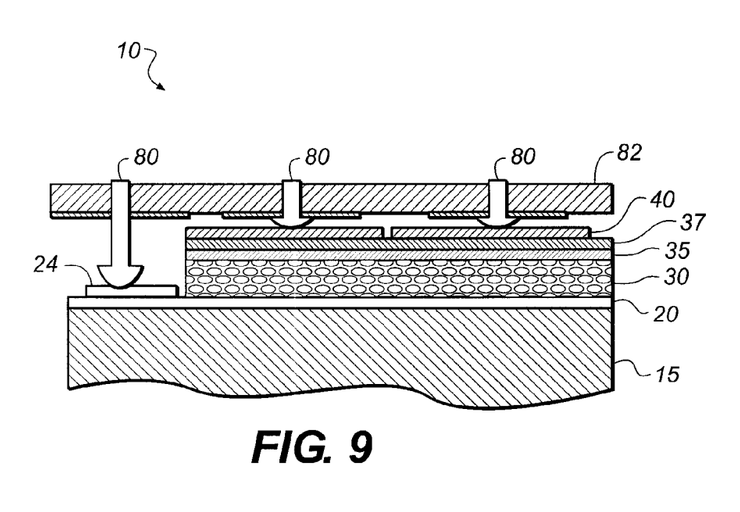
FIG. 9 is a side section view of a display in accordance with the present invention attached to a circuit board.
Figure 10:
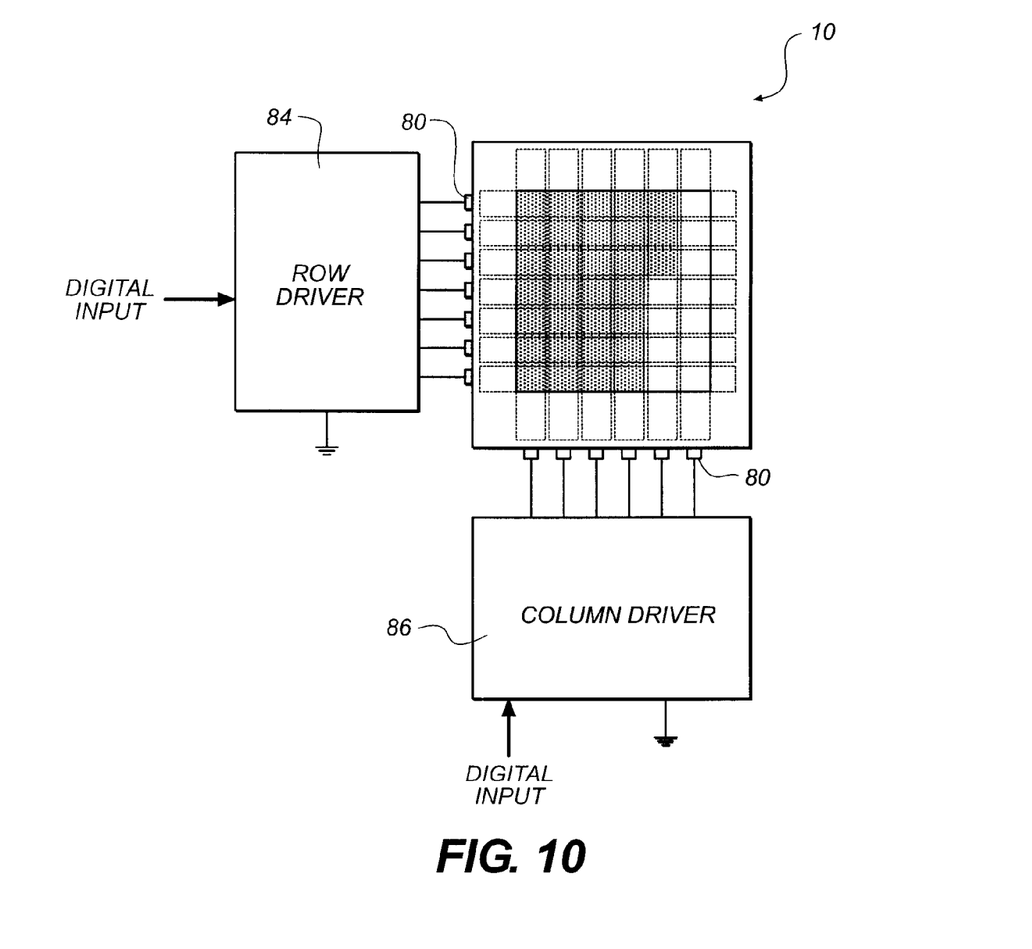
FIG. 10 is a front view of a display in accordance with the present invention connected to electric drive means.

FIG. 9 is a side section view of a display in accordance with the present invention attached to a circuit board. Contacts 80 on circuit board 82 provide electrical connection to each first conductor 20 through protective covering 24 and to each second conductor 40. FIG. 10 is a front view of a display in accordance with the present invention connected to electric drive means. Row driver 84 is connected by contacts 80 to second conductors 40. Column driver 86 is connected by contacts 80 to first transparent conductors 20 though protective covers 24. Electrical signals can be applied to row driver 84 and column driver 86 to write images onto display 10 using conventional cholesteric drive schemes.

The following examples are provided to illustrate the invention.

EXAMPLE 1

A solution suitable for creating a coated reflective layer was formed using:

| | |
|---|---|
| 2.86 gms. | Kodak gelatin, 35% concentration |
| 1.20 gms. | Accumet Materials Co. 1 micron Aluminum powder |
| 44.74 gms. | Deionized water |
| 0.21 gms. | Surfynol 131 dispersing agent |

The 1 micron aluminum powder was dispersed in a gelatin solution and coated as a wet layer over a color filter layer and dried to form a micron thick layer which was non conductive and highly reflective.

A complementary dye solution is made having 1.74% dissolved gelatin, 0.74% Sunfast Blue 15:4 milled to a 110 nanometer mean diameter and 0.1.55% Pigment violet 29 milled to a 210 nanometer mean diameter. The solution is coated over the polymer dispersed cholesteric liquid crystal at 10.76 grams per square meter and dried. The dried layer is less than 0.5 microns thick.

The dispersion was coated over a dry color filter layer 35 and dried to create a 1 micron thick reflective layer. Second conductors were printed over the reflective layer using UV cured silver ink. The reflective layer was over 90% reflective and extended applied electrical fields in areas between adjacent conductors. The display could be repeatedly switched between the planar and focal conic state with field blooming observed in both states.

The invention has been described in detail with particular reference to certain embodiments thereof, but it will be understood that variations and modifications can be effected within the spirit and scope of the invention.

PARTS LIST 10 display
15 display substrate
20 first conductors
22 exposed first conductors
30 cholesteric layer
35 color filter layer
37 reflective layer
40 second conductors 42 light absorber
60 incident light
62 planar reflected light
64 complementary light
72 planar liquid crystal
74 focal conic liquid crystal
80 contacts
82 circuit board
84 row driver
86 column driver
90 coating block
92 slot for fluidized reflective layer
96 slot for fluidized color filter layer
100 slot for fluidized cholesteric layer
P Planar state
FC Focal Conic state

The invention claimed is:

1. A display sheet comprising a substrate for carrying layers of material, an imaging layer comprising a bistable polymer dispersed cholesteric liquid crystal imaging layer, a first patterned transparent conductor disposed on one side of said bistable polymer dispersed cholesteric liquid crystal imaging layer, a color filter layer, at least one reflective field blooming layer coated over the color filter layer, and a second patterned electrode on the side of said bistable polymer dispersed cholesteric liquid crystal imaging layer opposite said first patterned conductor.

2. The display of claim 1 wherein said substrate is a flexible transparent substrate.

3. The display of claim 1 wherein said bistable polymer dispersed cholesteric liquid crystal imaging layer has a peak reflectance of 575 nanometers.

4. The display of claim 1 wherein said color filter layer comprises submicrometer pigment particles in a polymeric binder.

5. The display of claim 1 wherein said color filter layer operates in conjunction with a bistable polymer dispersed cholesteric liquid crystal imaging layer having peak reflectance near 575 nanometers to form a substantially color neutral reflected light said when said bistable polymer dispersed cholesteric liquid crystal imaging layer is in planar state.

6. The display of claim 1 wherein said color filter layer is less than 1 micrometer thick.

7. The display of claim 1 wherein said color filter layer comprises two or more differently hued pigments.

8. The display of claim 1 wherein said reflective field blooming layer comprises reflective aluminum particles in a binder.

9. The display of claim 8 wherein said reflective field blooming layer comprises 1 micron reflective aluminum particles in a gelatin binder.

10. The display of claim 8 wherein said particle to binder ratio is 1:1.

11. The display of claim 1 wherein said reflective field blooming layer comprises at least one fine reflective particle selected from the group consisting of aluminum, titanium, silver, nickel or chromium and combinations, oxides or nitrides thereof.

12. The display of claim 1 wherein said reflective field blooming layer is less than 2 microns thick.

13. The display of claim 1 wherein said reflective field blooming layer is located immediately adjacent to said color filter layer.

14. The display of claim 1 wherein said reflective field blooming layer reflects at least 90% of the light reaching said reflective field blooming layer.

15. The display of claim 1 wherein said reflective field blooming layer extends an applied electrical field over 1 mm from the edge of said first patterned transparent conductor or said second patterned conductor.

16. The display of claim 1 wherein said reflective field blooming layer has a sheet resistance greater than 1 mega ohm per square.

17. The display of claim 1 wherein said first patterned transparent conductor and said second patterned conductor are patterned to produce an addressable matrix display.

18. A method for producing a display sheet comprising:
providing a substrate for carrying layers of material;
applying an imaging layer comprising a bistable polymer dispersed cholesteric liquid crystal imaging layer;
applying a first patterned transparent conductor disposed on one side of said bistable polymer dispersed cholesteric liquid crystal imaging layer;
applying a color filter layer;
applying at least one reflective field blooming layer over said color filter layer; and
applying a second patterned electrode on the side of said bistable polymer dispersed cholesteric liquid crystal imaging layer opposite said first patterned conductor.

* * * * *